(12) United States Patent
Yang et al.

(10) Patent No.: US 8,346,767 B2
(45) Date of Patent: Jan. 1, 2013

(54) IMAGE SEARCH RESULT SUMMARIZATION WITH INFORMATIVE PRIORS

(75) Inventors: Linjun Yang, Beijing (CN); Rui Liu, Beijing (CN); Xian-Sheng Hua, Beijing (CN)

(73) Assignee: Microsoft Corporation, Redmond, WA (US)

( * ) Notice: Subject to any disclaimer, the term of this patent is extended or adjusted under 35 U.S.C. 154(b) by 156 days.

(21) Appl. No.: 12/764,917

(22) Filed: Apr. 21, 2010

(65) Prior Publication Data

US 2011/0264641 A1 Oct. 27, 2011

(51) Int. Cl.
*G06F 17/30* (2006.01)
*G06F 7/00* (2006.01)

(52) U.S. Cl. ........ 707/728; 707/706; 707/723; 707/724; 707/781; 715/838

(58) Field of Classification Search .................. None
See application file for complete search history.

(56) References Cited

U.S. PATENT DOCUMENTS

| | | | |
|---|---|---|---|
| 7,478,091 B2 | 1/2009 | Mojsilovic | |
| 2005/0086211 A1* | 4/2005 | Mayer | 707/3 |
| 2006/0015497 A1 | 1/2006 | Keating | |
| 2006/0294068 A1* | 12/2006 | Li et al. | 707/3 |
| 2007/0044010 A1 | 2/2007 | Sull | |
| 2007/0174872 A1* | 7/2007 | Jing et al. | 725/46 |
| 2007/0271297 A1* | 11/2007 | Jaffe et al. | 707/104.1 |
| 2008/0065685 A1 | 3/2008 | Frank | |
| 2009/0076797 A1 | 3/2009 | Yu | |
| 2010/0223276 A1* | 9/2010 | Al-Shameri et al. | 707/769 |

FOREIGN PATENT DOCUMENTS
WO 2008105962 A2 9/2008

OTHER PUBLICATIONS

Cui, J., F. Wen, X. Tang, Real time google and live image search re-ranking, Proc. of the 16th Int'l Conf. on Multimedia 2008, ACM Multimedia 2008, Oct. 26-31, 2008, pp. 729-732, Vancouver, British Columbia, Canada.

Fan, J., Y. Gao, H. Luo, D. A. Keim, Z. Li, A novel approach to enable semantic and visual image summarization for exploratory image search, Proc. of the 1st ACM SIGMM Int'l Conf. on Multimedia Info. Retrieval, MIR 2008, Oct. 30-31, 2008, pp. 358-365, Vancouver, British Columbia, Canada.

(Continued)

*Primary Examiner* — Greta Robinson
*Assistant Examiner* — Dung K Chau
(74) *Attorney, Agent, or Firm* — Lyon & Harr, L.L.P.; Craig S. Fischer

(57) ABSTRACT

An informative priors image search result summarization system and method that summarizes image search results based on the image relevance (as determined by a search engine's initial ranking) and the image quality. Embodiments of the system and method cluster the image search results, rank images within each cluster based on a computed image score, and then select a summary image for the cluster. Each cluster is analyzed and an image in the cluster having the maximum image score is included in a selected summary collection. The image score is computed using the image relevance and the image quality, as well as a cluster coherence, a density, and a diversity. The selection of images from a collection of candidate images generates an image search result summarization, which is presented to a user. The summaries are presented to the user in a ranked order based on their image scores.

19 Claims, 7 Drawing Sheets

OTHER PUBLICATIONS

Frey, B. J., D. Dueck, Clustering by passing messages between data points, Science Magazine, Feb. 2007, pp. 972-976, vol. 315, No. 5814.

Joachims, T., Training linear SVMs in linear time, ACM SIGKDD, Aug. 20-23, 2006, pp. 217-226, Philadelphia, USA.

Kennedy, L. S., M. Naaman, Generating diverse and representative image search results for landmarks, Proc. of the 17th Int'l Conf. on World Wide Web, WWW 2008, Apr. 21-25, 2008, pp. 297-306, Beijing, China.

Luo, Y., X. Tang, Photo and video quality evaluation: Focusing on the subject, Proc. of the 10th European Conf. on Comp. Vision, Oct. 12-18, 2008, pp. 386-399, Marseille, France.

Mei, T., X.-S. Hua, C.-Z. Zhu, H.-Q. Zhou, S. Li, Home video visual quality assessment with spatiotemporal factors, IEEE Trans. Circuits Syst. Video Techn., Jun. 2007, pp. 699-706, vol. 17, No. 6.

Raguram, R., S. Lazebnik, Computing iconic summaries of general visual concepts, IEEE Comp. Society Conf. on Comp. Vision and Pattern Recognition Workshops, CVPRW 2008, Jun. 23-28, 2008, pp. 1-8.

Sclaroff, S., L. Taycher, M. L. Cascia, ImageRover: A content-based image browser for the World Wide Web, Proc. IEEE Workshop on Content-based Access of Image and Video Libraries, Jun. 20, 1997, pp. 2-9.

Simon, I., N. Snavely, S. M. Seitz, Scene summarization for online image collections, IEEE 11th Int'l Conf. on Comp. Vision, ICCV 2007, Oct. 14-20, 2007, pp. 1-8, Rio de Janeiro, Brazil.

Yanai, K., An automatic image-gathering system for the World-Wide Web by integration of keywords and image features, Proc. of the Fourth Int'l Conf. on Computational Intelligence and Multimedia Applications, Oct. 30-Nov. 1, 2001, pp. 303-307.

Yang, Y.-H., P. T. Wu, C. W. Lee, K. H. Lin, W. H. Hsu, H. H. Chen, ContextSeer: Context search and recommendation at query time for shared consumer photos, Proc. of the 16th Int'l Conf. on Multimedia, Oct. 27-Nov. 1, 2008, pp. 199-208, Vancouver, British Columbia, Canada.

Yu, H., Towards answering biological questions with experimental evidence: Automatically identifying text that summarize image content in full-text articles, AMIA Annu Symp Proc., Nov. 11-15, 2006, pp. 834-838, Washington DC, USA.

Zhu, X., A. B. Goldberg, J. Van Gael, D. Andrzejewski, Improving diversity in ranking using absorbing random walks, Proc. of the Human Language Technology Conf. of the North American Chapter of the Assoc. of Computational Linguistics, HLT-NAACL 2007, Apr. 22-27, 2007, pp. 97-104, Rochester, New York, USA.

\* cited by examiner

IMAGE SEARCH RESULT SUMMARIZATION WITH INFORMATIVE PRIORS

BACKGROUND

An image search engine provides a convenient tool for users to retrieve their desired images from the large amount of images on the Web. However, users often find it difficult to identify the interesting images in the returned results that typically are returned by the search engine due to the excessive amount of images contained in the returned results. One way to lessen the time involved for a user to find interesting images in the returned results is image search result summarization. In general, image search result summarization selects representative images from the returned results for presentation to the user and alleviates the need for users to browse each of the images in the returned results.

For example, consider the situation where a user issues a query "apple" and the search engine returns hundreds of images sorted by relevance. The images returned for query "apple" may range from the fruit apple to Apple Inc. products, and even to apple-shaped rock. It is quite inefficient for a user to browse each image in the returned results to find the desired images. Actually, when several topics for "apple" are presented, users are able to obtain their targets more conveniently.

There are a variety of image collection summarization (ICS) techniques that are effective in selecting representative images from an image collection. In particular, one image collection summarization technique for automatically creating image summaries from an image collection formulates the problem as an optimization problem. This technique takes the image coverage and diversity into consideration and then describes a greedy algorithm to solve the optimization problem. Another technique uses landmark summarization and employs K-Means to cluster the images into visually similar groups. Then the technique select images from the clusters according to some heuristic criteria including visual coherence and interest point connections. Yet another technique computes an optimal partition based on a mixture-of-kernels technique and uses a sampling algorithm to select representative images. Still another technique uses a greedy method to recommend canonical images. This technique first adopts visual words to represent the visual features in a scene and then iteratively select the images that cover the most informative visual words. Another technique clusters photographs by utilizing image content and associated tags to summarize general queries, such as "love", "CLOSEUP" and so on.

Although the above image collection summarization techniques are effective in selecting representative images from a collection, they are not optimal to summarize image search results. This is due to several reasons. One reason is that an image search engine often returns some noisy images that ideally should not be contained in the summarization result. Thus, selecting images primarily by coverage and diversity (as most of the ICS methods do) is not a good strategy in noisy circumstances. A second reason is that these image collection summarization techniques tend to ignore image relevance and assuming the images in the collection are all relevant. However, the relevance obtained from the search engine is useful prior information for images to be selected as summaries. The third reason is that the image quality in the summarization result is desirable for a quality users' experience. Low-quality images are non-informative for users if they occur in the summaries, since users cannot get the "complex" idea from such small-sized thumbnails. Studies have shown that a user's experience significantly suffers from low-quality summaries and that most users cannot tolerate any thumbnail images with low resolution.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the informative priors image search result summarization system and method summarize image search results by taking the relevance and quality as informative priors. Embodiments of the system and method can be broadly divided into two steps: a clustering step and a selection and ranking step. In the clustering step, embodiments of the system and method generate summary candidates based on a clustering method with the informative priors of relevance and quality. In the selection and ranking step, embodiments of the system and method obtain the summary by selecting the top candidates which are ranked according to the prior, reliability and redundancy penalty. Embodiments of the informative priors image search result summarization system and method can achieve a user friendly summarization in terms of relevance, diversity and coverage.

Embodiments of the informative priors image search result summarization system and method define image search result summarization as a problem of extracting the most "important" images of search results. Important images mean that they are relevant to queries, attractive to users, and representative for the different subtopics. Embodiments of the informative priors image search result summarization system and method employ several criteria (such as relevance and quality) to capture human's perception of image summaries. Embodiments of the system and method take the initial rank returned by the search engine as the relevance information. Several features including dynamic range, color entropy, brightness, blur (which describes a sharpness of an image) and contrast are employed to train a quality model. In order to select the representative images with little redundancy, embodiments of the informative priors image search result summarization system and method clusters the images to find the exemplars using an affinity propagation technique. Embodiments of the system and method then greedily select summaries from the exemplars according to several criteria such as relevance, quality, reliability, and redundancy penalty.

Embodiments of the informative priors image search result summarization system and method input image search results obtained from a search engine and provide a summarization of the image search results. The image search results are initially ranked by the search engine and then provided to embodiments of the system and method. Embodiments of the system and method then define an image relevance for each image in the image search results. In some embodiments the image relevance is a rank of an image in the image search results as ranked by the search engine. Embodiments of the system and method then compute an image quality for each image based on one or more image quality measures, and then cluster images in the image search results using a clustering technique. The clustering technique uses as a first informative prior the image quality for each image and as a second informative prior the image relevance for each image. This generates summary candidate collection that contains image clusters and an exemplar image for each cluster.

Embodiments of the informative priors image search result summarization system and method then select certain images from the summary candidate collection and then rank the selected images. This generates an image search result summarization, which is presented to a user. The selection and ranking is achieved by computing an image score for each image in the summary candidate collection and then ranking each image in the summary candidate collection based on its image score. In particular, each cluster is analyzed and an image in the cluster having the maximum image score is selected to be included in a selected summary collection, or image search result summary. The summaries are presented to the user in a ranked order based on image scores.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the informative priors image search result summarization system and method reference is made to the accompanying drawings, which form a part thereof, and in which is shown by way of illustration a specific example whereby embodiments of the informative priors image search result summarization system and method may be practiced. It is to be understood that other embodiments may be utilized and structural changes may be made without departing from the scope of the claimed subject matter.

I. System Overview

Figure 1:
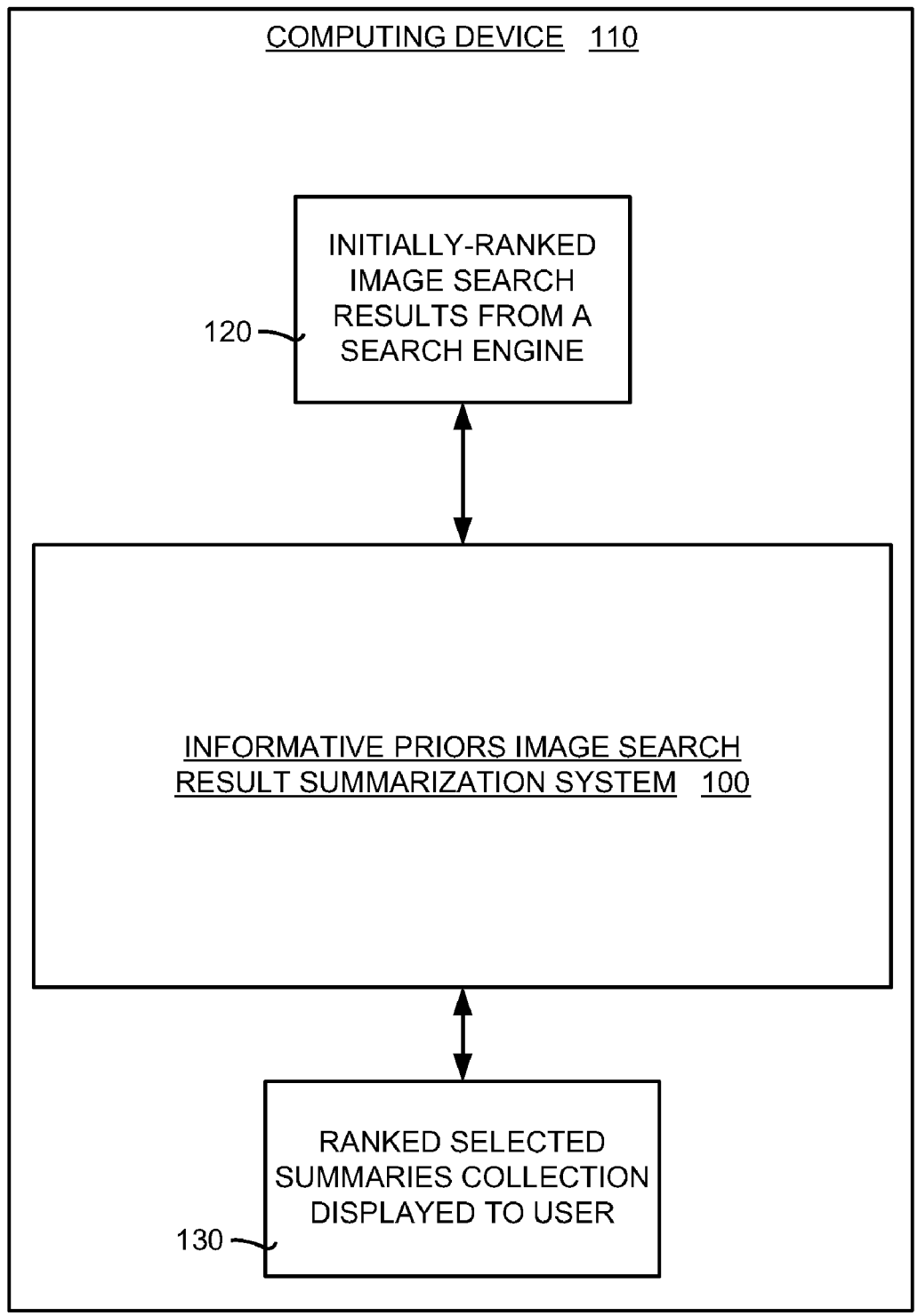
FIG. 1 is a block diagram illustrating a general overview of embodiments of the informative priors image search result summarization system and method implemented on a computing device.

FIG. 1 is a block diagram illustrating a general overview of embodiments of the informative priors image search result summarization system 100 and method implemented on a computing device 110. In general, embodiments of the informative priors image search result summarization system 100 and method take an image search result obtained by a search engine and provide a user with an improved summarization of the results. This image search result summarization is performed taking into account the quality of the images in the search result and the relevance (based on the initial search engine ranking) of the images in the search result.

More specifically, embodiments of the informative priors image search result summarization system 100 shown in FIG. 1 receive initially-ranked image search results from a search engine 120. These image search results typically are in response to a query from a user to the search engine. Embodiments of the informative priors image search result summarization system 100 then process the initially-ranked image search results from the search engine 120 and output a ranked selected summaries collection that is displayed to the user 130. This output summarizes the search results based on image quality and image relevance. In addition, the summaries are ranked so that the user can quickly determine which images returned by the search engine may be closest to what images the user desired.

Figure 2:
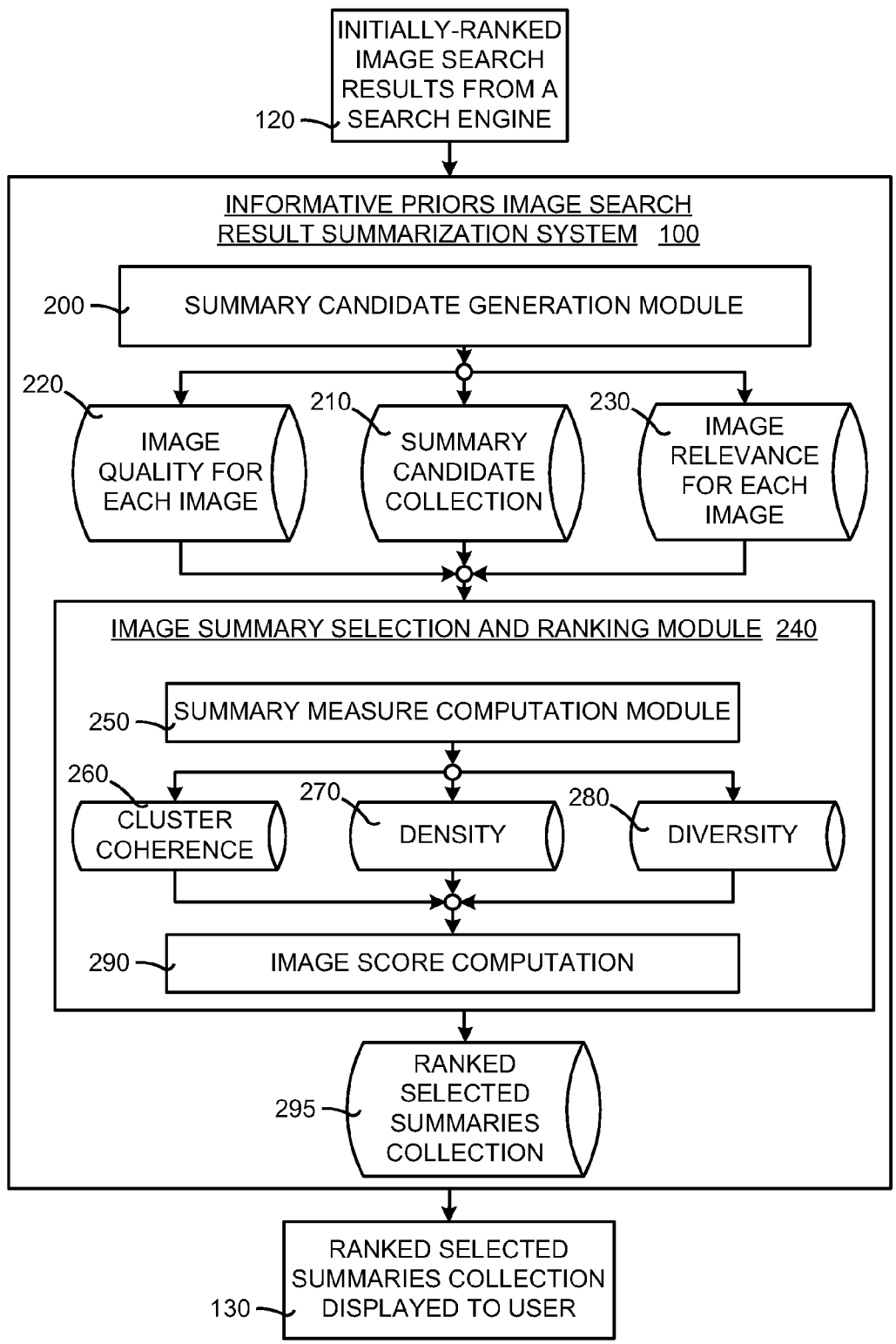
FIG. 2 is a block diagram illustrating modules and data used in embodiments of the informative priors image search result summarization system and method shown in FIG. 1.

FIG. 2 is a block diagram illustrating modules and data used in embodiments of the informative priors image search result summarization system 100 and method shown in FIG. 1. In general, embodiments of the informative priors image search result summarization system 100 include modules for generating a collection of candidate images and modules for selecting and ranking images from the candidate collection. More specifically, embodiments of the informative priors image search result summarization system 100 include a summary candidate generation module 200 that generates a collection of candidate images using clustering techniques. The summary candidate generation module 200 inputs the initially-ranked image search results from a search engine 120 and then processes these results. The output of the module is a summary candidate collection 210, an image quality for each image 220, and an image relevance for each image 230. The summary candidate collection 210 contains a plurality of images that are clustered based on the clustering techniques. These images are candidates that may be used as a summary image for the search results.

Embodiments of the informative priors image search result summarization system 100 also include an image summary selection and ranking module 240 for selecting and ranking images from the image summary collection 210. The image summary selection and ranking module 240 includes a summary measure computation module 250 that computes various measures or features of each image. These features include a cluster coherence 260, a density 270, and a diversity 280.

The features are used by the image summary selection and ranking module 240 to compute an image score 290 for each image. Each image score also takes into account the image quality for each image and the image relevance for each image 230. Based on the image score, the images within a cluster are ranked and at least one image from each cluster is selected for inclusion in a ranked selected summaries collection 295. The output is the ranked selected summaries collection that is displayed to the user 130. This display allows the user to quickly find his desired images.

II. Operational Overview

Figure 3:
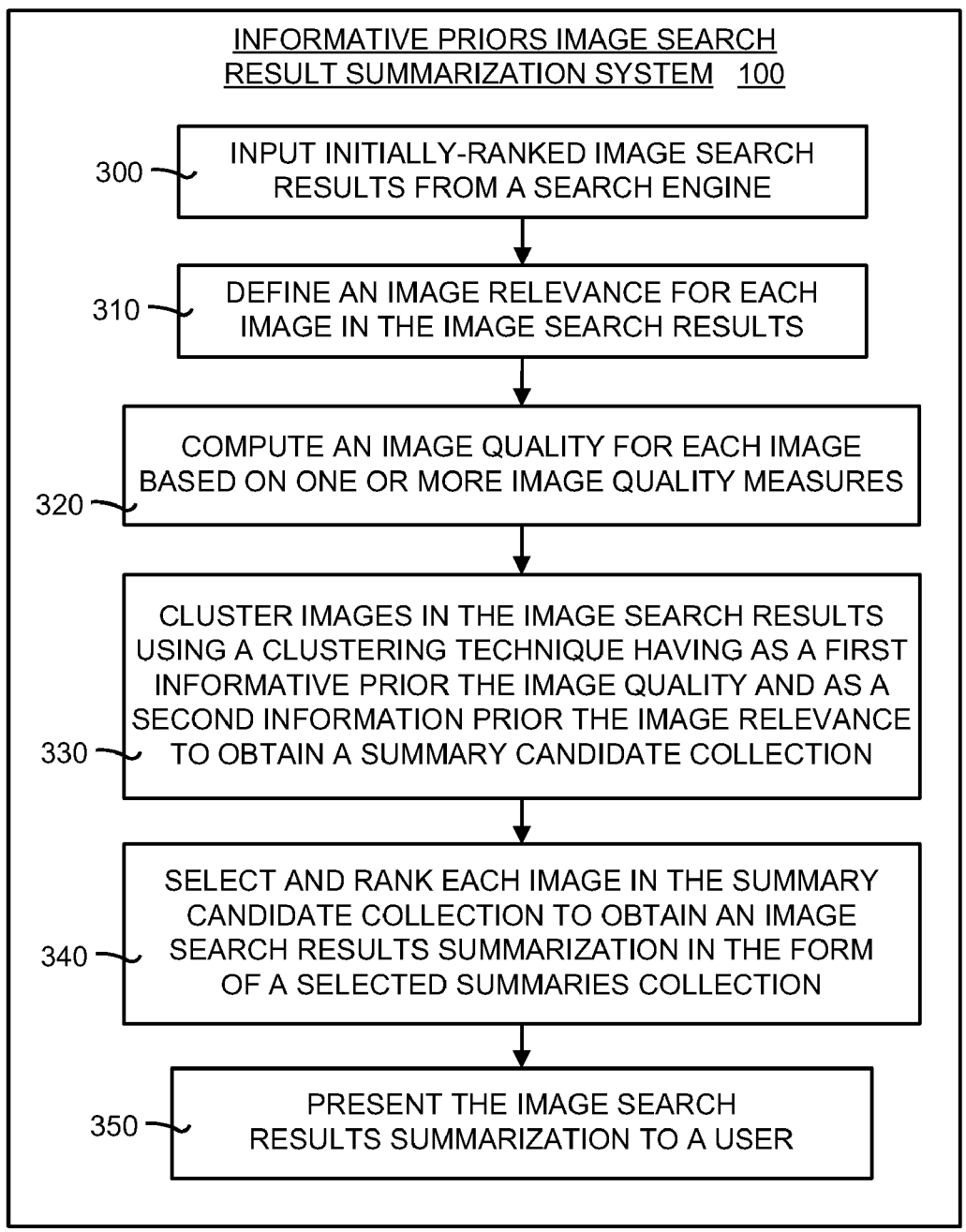
FIG. 3 is a flow diagram illustrating the general operation of embodiments of the informative priors image search result summarization system shown in FIGS. 1 and 2.

FIG. 3 is a flow diagram illustrating the general operation of embodiments of the informative priors image search result summarization system 100 shown in FIGS. 1 and 2. Referring to FIG. 3, the method begins by inputting an initially-ranked image search results from a search engine (box 300). These are usually images returned by a search engine in response to an query by a user. The images are ranked by the search engine according to relevance.

Next, the system 100 defines an image relevance for each image in the image search results (box 310). The image relevance is the rank of an image in the initially-ranked image search results, as ranked by the search engine. The system 100 then computes an image quality for each image (box 320). The image quality may be based upon one or more image quality measures, as explained in detail below.

The images in the image search results then are clustered using a clustering technique (box 330). The clustering technique uses as a first informative prior the image quality for a particular image. The clustering technique also uses as a second informative prior the image relevance for the image. In some embodiments the clustering technique is an Affinity Propagation technique. This clustering generates a summary candidate collection that contains each of the image contained in the cluster as well as an exemplar image for each cluster.

The system 100 then selects and ranks each image in the summary candidate collection (box 340). As explained in detail below, this selecting and ranking is achieved by computing an image score for each image using the image quality, image relevance, as well as other performance measures. The result of this selecting and ranking is an image search results summarization in the form of a selected summaries collection. This image search results summarization (or selected summaries collection) then is presented to a user (box 350). The summaries contained in the image search results summarization are presented in there ranked order, as ranked by the system 100.

III. System and Operational Details

The system and the operational details of embodiments of the informative priors image search result summarization system 100 and method now will be discussed. These embodiments include embodiments of the summary candidate generation module 200, the summary measure computation module 250, and the image summary selection and ranking module 24. The system and operational details of each of these modules now will be discussed in detail.

III.A. Summary Candidate Generation Module

The summary candidate generation module 200 generates a summary of candidates images based on image quality and relevance. For each image in the initial search results, the module 200 first estimate the relevance and quality, which then is combined as a prior as to whether the image is selected as a summary. The module 200 then selects exemplars by using a clustering technique (such as an Affinity Propagation (AP) algorithm) with the prior to generate the candidates for summarization.

III.A.1. Affinity Propagation Algorithm Overview

The summary candidate generation module 200 uses an exemplar-based clustering algorithm. In some embodiments, this exemplar-based clustering algorithm is an Affinity Propagation (AP) algorithm. The reason for using the AP clustering method is two-fold. First, it is difficult for other clustering methods to take the relevance and quality factors into account as a prior, while the AP algorithm allows a prior to be assigned for each image. Second, the AP clustering method does not require predefining the number of clusters, which is usually hard to determine for the summarization problem.

A general mathematical description of the AP clustering method is as follows. Considering all N data points as potential exemplars, the AP algorithm clusters data according to two kinds of messages exchanged between data points. One kind of message is the "responsibility" r(i,k), sent from data point i to k. This term reflects how well-suited k is to serve as the exemplar for i in view of other potential exemplars. The kind of messages is the "availability" a(i,k). This is sent from point k to i and reflects how appropriate it would be for i to choose k as its exemplar considering the support from other points that k is a candidate for an exemplar. The computational cost of the AP algorithm is $O(N^2T)$ where T is the number of iterations.

One input to the AP algorithm is the similarity matrix of the N data points. Another input is the preference, which can be regarded as the informative prior for each image to be selected as an exemplar. With the informative prior, the AP algorithm does not need to specify the number of clusters. In the output of AP clustering algorithm, every data point i has its corresponding exemplar k. This means that the image $I_i$ can be represented by $I_k$. This is denoted as $S(I_i)=I_k$.

III.A.2. Using Image Quality and Relevance as Measures in the AP Algorithm

The summary candidate generation module 200 uses several criteria to measure the prior of an image to be contained in a summary. Each prior for an image then is used by the AP framework. Mathematically, the informative prior for each image as an exemplar is estimated using a linear model of the relevance $R(I_i,q)$ and quality $Q(I_i)$ given by:

$$\text{Prior}(I_i,q)=\omega_1 R(I_i,q)+\omega_2 Q(I_i)+c \qquad 1$$

where $I_i$ is the $i^{th}$ image in the search result, q is a given query, and c is a constant.

In the following sections the estimation of relevance and quality is set forth.

III.A.2.i. Relevance

In general, relevance is estimated by making use of the initial rank of an image. The initial rank records the ranked position of each image returned directly by the search engine. This initial ranking is useful because top-ranked images are more likely to be representative images than bottom-ranked images. This suggests that relevance is a factor that influences a human's decision to select summary images and that the rank provided by search engines is a good indication of the "true" relevance of an image.

Mathematically, given N retrieved images under a specified query q, the relevance score for each image $I_i$ is defined as:

$$R(I_i,q)=1-\text{Pos}(I_i,q)/N, i=1,\ldots,N \qquad 2$$

where $\text{Pos}(I_i,q)$ is the position of the image $I_i$ in the search result.

III.A.2.ii. Quality

Images presenting a good appearance are likely to attract more attention. Good appearance means that the image has both a clear view and high aesthetics. The system and method use the following set of quality measures that are effective in describing the quality of an image to predict whether an image has a good appearance. In various embodiments, a single quality measure, any combination of a quality measures, or all of the quality measures, may be used by the summary candidate generation module 200 to predict image quality.

Dynamic Range: Dynamic range is used for denoting the luminance range of a scene being photographed. The value is computed by the ratio between the maximum and minimum measurable light intensities.

Color Entropy: Color entropy may be used to describe the colorlessness of the image content.

Brightness: A large amount of low-quality images are photographed with insufficient light. Any one of a number of available algorithms can be used to calculate the brightness for each image.

Blur: Any one of a number of blur algorithms can be used to find the blur. A blur algorithm that is designed to work well for web images is useful.

Contrast: Good images are generally under strong contrast between the subject and the background. A number of available algorithms can be used compute the contrast.

Each of the above-described quality measures returns a score for each of the images. The quality factor $Q(I_i)$ is further a linear combination of dynamic range, color entropy, brightness, blur and contrast. To learn the weights of the quality factors automatically, the system and method construct a training set by labeling images into low-quality images (which are fuzzy and unpleasant images), middle-quality images (which are not good enough to be contained in a summary), and high-quality images (good looking and easy to understand). In some embodiments a ranking support vector machine technique is used to train the quality model.

III.A.2.iii. AP Algorithm Incorporating Image Quality and Relevance

Figure 4:
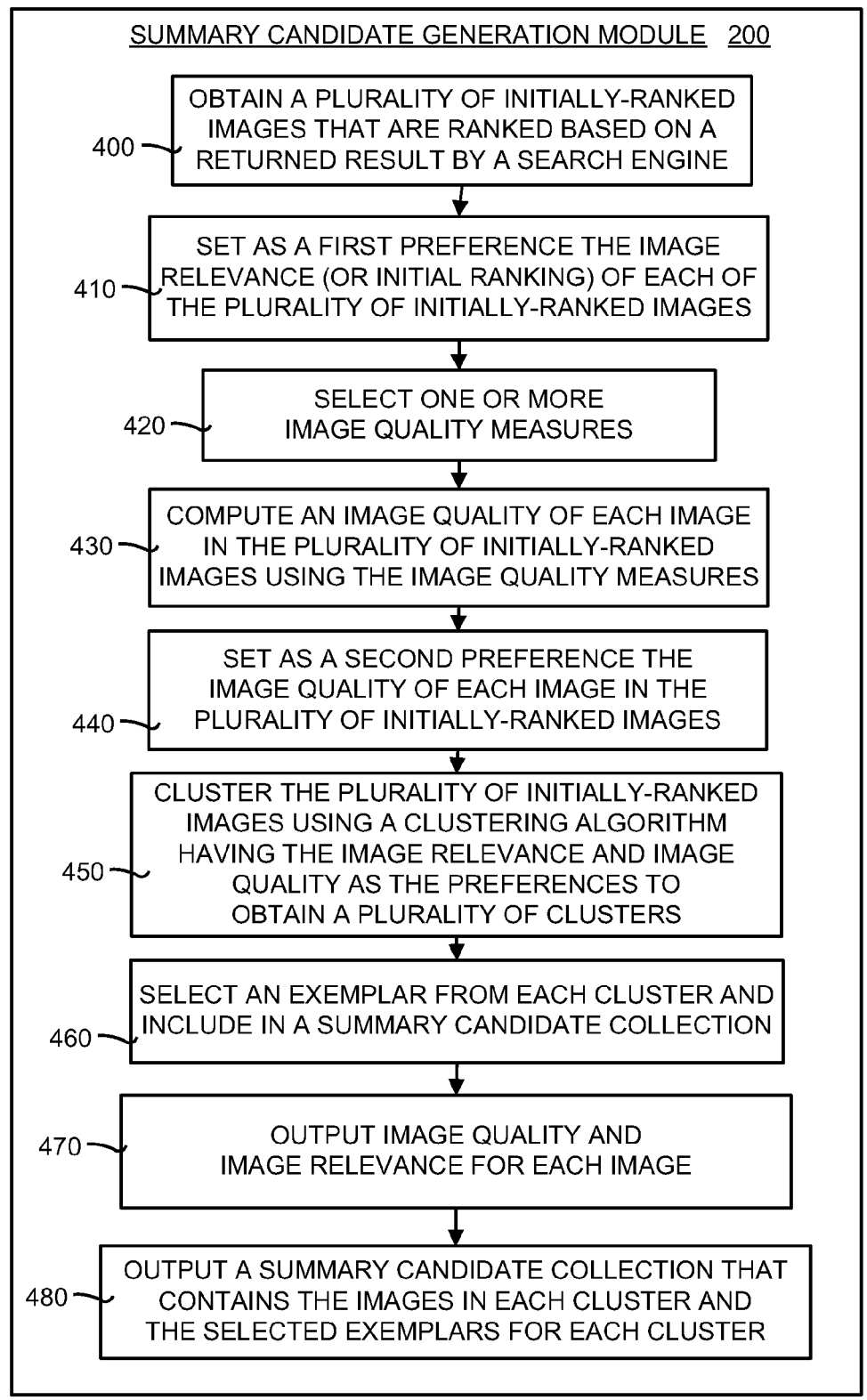
FIG. 4 is a flow diagram illustrating the operational details of embodiments of the summary candidate generation module shown in FIG. 2.

FIG. 4 is a flow diagram illustrating the operational details of embodiments of the summary candidate generation module 200 shown in FIG. 2. The operation begins by obtaining a plurality of initially-ranked images (box 400). These images are the images returned by a search engine in response to a user's search query, and are ranked by the search engine accordingly to relevance to the user's search query. Next, the module 200 sets as a first preference (or informative prior) the relevance (or initial ranking) of each image contained in the results returned by the search engine (box 410).

One or more image quality measures also are selected (box 420). This selection may be done automatically by the module 200 or selected manually (such as by the user). Next, the module 200 computes an image quality of each image in the plurality of initially-ranked images using the selected image quality measures (box 430). The module 200 then sets as a second preference (or informative prior) the image quality of each image in the plurality of initially-ranked images (box 440).

A clustering technique then is used to cluster the plurality of initially-ranked images (box 450). The clustering technique clusters the images based on the image relevance and the image quality of each image. In some embodiments, the AP algorithm is used as the clustering technique. Mathematically, the AP algorithm clusters the top N images and outputs selected exemplars. The AP algorithm uses the image initial rank (which is the position in the returned result by the search engine) and image quality and sets them as the preferences (or informative priors). In some embodiments the image quality is accessed using color entropy Denoting the image in the $i^{th}$ position in the search result as $I_i$, the quality score of image $I_i$ is $Q(i)$ and $R(i)$ is a transformation to obtain a relevance score from the ranking position, and then the preference (or informative prior) is estimated as $$P_i = \alpha \times R(i) + \beta \times Q(i) + c$$

The exemplars selected are denoted as E. As explained in detail below, since the number of exemplars may be larger than a desired number of summaries, a post-selection step may be performed to select the desired images from the exemplars for summarization.

The result of this clustering is a plurality of clusters. The module 200 then selects an exemplar from each cluster (box 460). The exemplar is an image that represents the cluster.

Each exemplar then is saved in a summary candidate collection. This collection contains candidates that may be used in the final summarization of the image search result. The output of the module 200 is the image quality and image relevance for each image (box 470), and the summary candidate collection that contains both the images in each cluster and the selected exemplars for each cluster (480).

III.B. Image Summary Selection and Ranking Module

The image summary selection and ranking module 240 both ranks and selects the most competitive summary candidates to form a summary. Competitiveness is a measure that serves to minimize the redundancy while maximizing both the candidate's prior confidence and reliability.

III.B.1. Summary Measure Computation Module

Figure 5:
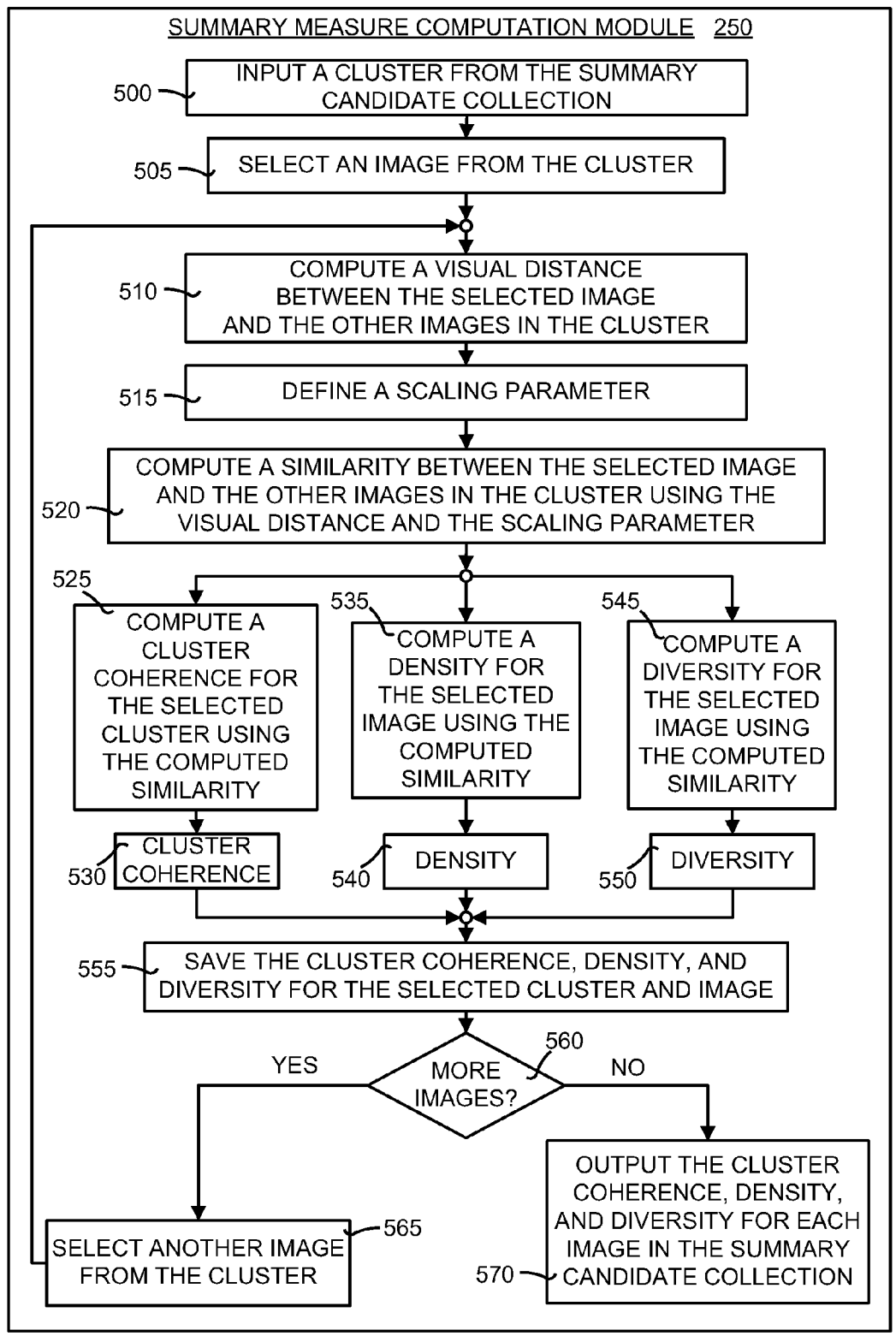
FIG. 5 is a flow diagram illustrating the operational details of embodiments of the summary measure computation module shown in FIG. 2.

The image summary selection and ranking module 240 includes a summary measure computation module 250. FIG. 5 is a flow diagram illustrating the operational details of embodiments of the summary measure computation module 250 shown in FIG. 2. In general, the module 250 computes competitiveness measures that are to compute a score for each image. These image scores are used to select summary images for each cluster in the summary candidate collection and then rank those summary images for presentation to a user.

More specifically, the operation of the module 250 begins by inputting a cluster from the summary candidate (box 500). Next, the module 250 selects an image from the cluster (box 505). In general, each image from each cluster is processed in the following manner. First, the module 250 computes a visual distance between the selected image and other images in the selected cluster (box 510). Next, a scaling parameter is defined (box 515), and the module 250 computes a similarity between the selected image and the other images in the cluster using the visual distance and the scaling parameter (box 520).

The module 250 then computes (box 525) a cluster coherence 530 for the selected cluster. Moreover, the module 250 computes (box 535) a density 540, and computes (box 545) a diversity 550 for the selected image using the computed similarity. The cluster coherence 530 is saved for the selected cluster, while the density 540, and diversity 550 are saved for the selected image (box 555).

The cluster coherence 530 is computed as the sum of the similarities between the all of the pairs of images in the cluster. For the clusters, where all of the users are close, the coherence is good. For clusters where the images are farther away the coherence is not as good. A larger cluster coherence 530 means the images pairs are more similar as compared to a smaller cluster coherence 530. This means that the images pairs are less similar. It should be noted that the cluster coherence 530 measures the quality of the cluster (and not the individual images).

The second measure is the density 540, which is the probability that the image will be in the search results. If there are many similar images in the results, then this corresponds to a higher density 540. The third measure is the diversity 550 function, which determines the similarity of the image to the selected images. The idea is that for 4 selected images, if the fifth image is similar to any of the previous 4 images, then it should not be selected because it has low diversity 550 and information. This is to avoid redundancy in the selected image. In other words, if 4 images are selected and it is only similar to one of the 4 picked images, then this is a smaller diversity 550. The goal is to try and make the selected images not redundant. Note that If diversity 550 is high then redundancy is low. It should also be noted that the computation of the cluster coherence 530, density 540, and diversity 550 can be done simultaneously.

Mathematically, in some embodiments the visual distance and similarity are computed as follows. The distance between two images Dis(i,j) is computed using standard techniques. Then, the similarity $S(I_i, I_j)$ is based on the distance.

$$S(I_i, I_j) = \exp\left(-\frac{\text{Dis}(i, j)}{\sigma^2}\right)$$

where σ is the scaling parameter.

In some embodiments the cluster coherence 530 is defined as follows. For each exemplar image $E_i$, there is a cluster of images associated with it as outputted in the clustering technique (such as the Affinity Propagation algorithm, which is defined as $C_i$. Then the cluster coherence 530 of the cluster $C_i$ is defined as:

$$\text{Coh}(i) = \sum_{I_i, I_j \in C_i} S(I_i, I_j)$$

where $S(I_i, I_j)$ is the similarity between the two images.

In some embodiments the density 540 is estimated using a classical method, the Kernel Density Estimation, as follows.

$$\text{Dens}(i) = \sum_{I_j} S(I_i, I_j),$$

where $I_j$ are the images in the search result other than $I_i$.

In some embodiments the diversity 550 is computed as follows. Define the selected images as B. Then the diversity 550 measure for image $I_i$ is defined as:

$$\text{Div}(i) = -\max_{I_j \in B} S(I_i, I_j).$$

The module 250 then determines whether there are more images in the selected cluster to process (box 560). If so, then the module 250 selects another image from the selected cluster (box 565), and the process begins again for the new selected image. Otherwise, the module 250 outputs the cluster coherence, density, and diversity for each image in the summary candidate collection (box 570).

III.B.2. Operation of the Image Summary Selection and Ranking Module

Figure 6:
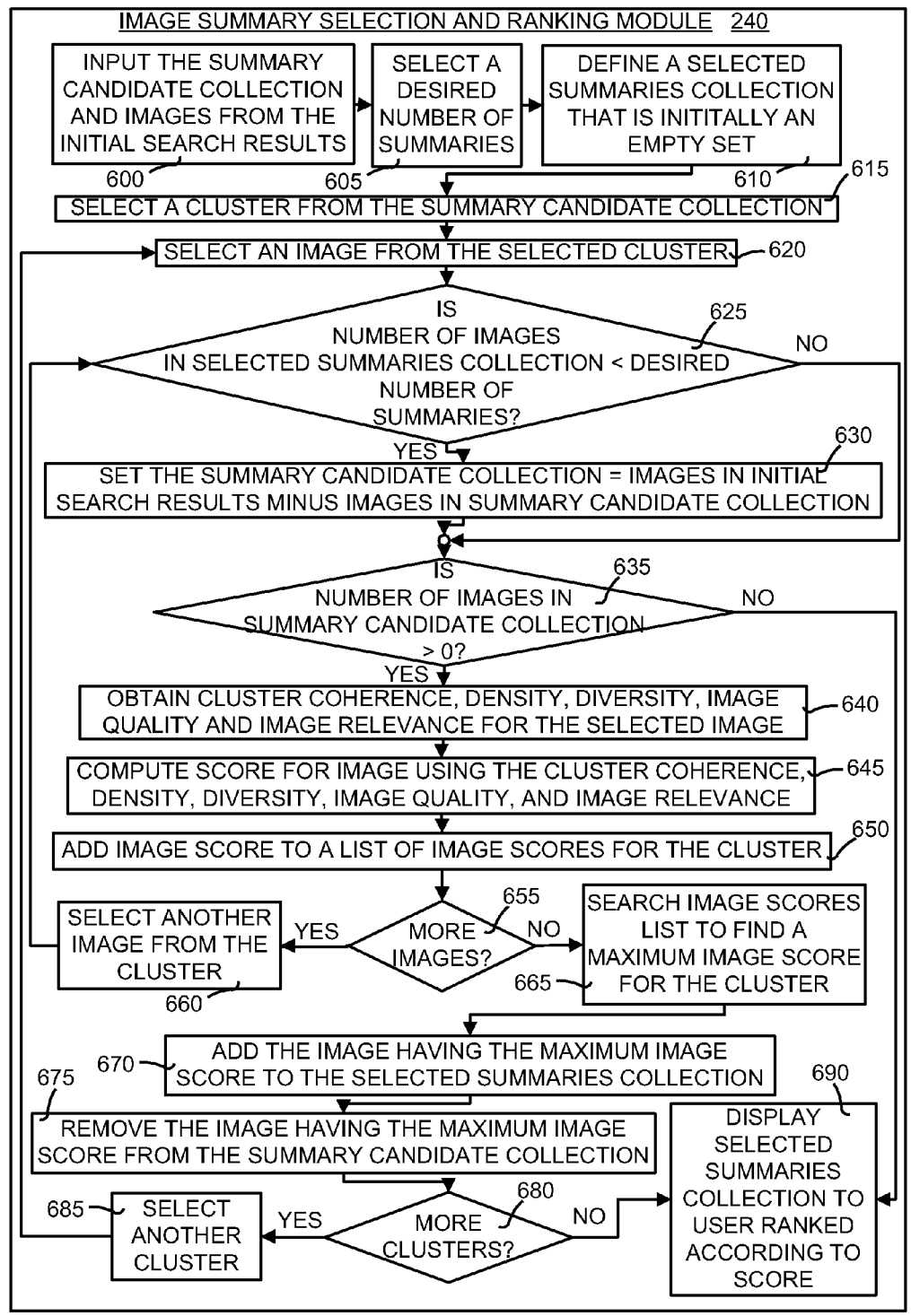
FIG. 6 is a flow diagram illustrating the operational details of embodiments of the image summary selection and ranking module shown in FIG. 2.

FIG. 6 is a flow diagram illustrating the operational details of embodiments of the image summary selection and ranking module 240 shown in FIG. 2. The operation begins by inputting the summary candidate collection along with the image from the initial search results (box 600). Next, a desired number of summaries, $N_S$, is selected (box 605). In some embodiments the selection is automatically done by the module 240, while in other embodiments the selection is done manually by a user.

The module 240 then defines a selected summaries collection, A, that is initially an empty (or null) set (box 610). This initialization action sets the select summaries collection, to an empty set. Moreover, the summary candidate collection is denoted as CAN, which is the images and cluster generated by the clustering technique of the summary candidate generation module 200.

The module 240 then select a cluster from the summary candidate collection (box 615). In addition, an image from the selected cluster is selected by the module 240 (box 620). A determination then is made as to whether the number of images in the selected summaries collection is less than the desired number of summaries (box 625). If so, then the module 240 sets the summary candidate collection equal to the image in the initial search results minus the image in the summary candidate collection (box 630).

Otherwise, the module 240 makes a determination as to whether the number of images in the summary candidate collection is greater than zero (box 635). If so, then the module 240 obtains the cluster coherence 530, the density 540, the diversity 550, the image quality, and the image relevance for the selected image (box 640). These measure are obtained from the summary candidate generation module 200 and the image summary selection and ranking module 240.

Next, the module 240 computes an image score for the selected image using the cluster coherence 530, the density 540, the diversity 550, the image quality, and the image relevance for the selected image (box 645). Mathematically, the image score, $S_i$ for each of the images in summary candidate collection, CAN, is computed as:

$$S_i = W_1 \times \text{Coh}(i) + W_2 \times \text{Dens}(i) + W_3 \times \text{Div}(i) + \alpha \times R(i) + \beta \times Q(i),$$

Where Coh(i) is the cluster coherence 530 for a selected cluster, Dens(i) is the density 540 for the $i^{th}$ image, Div(i) is the diversity 550 for the $i^{th}$ image, R(i) is the image relevance for the $i^{th}$ image, and Q(i) is the image quality for the $i^{th}$ image. Moreover, $W_1$ is a first weight, which is the weight of the cluster coherence 530 term, $W_2$ is a second weight, which is the weight of the density 540 term, and $W_3$ is a third weight, which is the weight of the diversity 550 term. For example, $W_1$ would be larger that the other weights if it was desirable to give more weight to the coherence 530 term. In some embodiments, the weights are determined either by the user and in other embodiments the weights are determined based on experimental results of which combination of weights provides the most desirable results. Moreover, α is a first parameter, which is a parameter for the image relevance, and β is a second parameter, which is a parameter for the image quality.

The image score for the selected image is added to a list of images score for the selected cluster (box 650). A determination then is made as to whether the cluster contains more images (box 655). If so, then the module 240 selects another image from the selected cluster (box 660) and the process is performed on the new selected image. If not, then the module 240 searches the list of images scores to find and identify the image in the cluster having a maximum image score for the cluster (box 665).

The module 240 then adds the image in the selected cluster having the maximum image score to the selected summaries collection (box 670). Moreover, the module 240 removes the images having the maximum image score from the summary candidate collection (box 675). A determination then is made as to whether there are more clusters to be processed (box 680). If so, then the module 240 selects another cluster (box 685) and processes each of the images in the cluster as set forth above. The image in each cluster having the maximum image score is added to the selected summaries collection. If there are no more clusters, or if the number of images in the selected summaries collection is greater than the desired number of summaries (box 625), then the module 240 displays the selected summaries collection to a user (box 690). The selected summaries collection is displayed to the user in a ranked manner, where the ranking is based on the image score associated with each image.

IV. Exemplary Operating Environment

Embodiments of the informative priors image search result summarization system 100 and method are designed to operate in a computing environment. The following discussion is intended to provide a brief, general description of a suitable computing environment in which embodiments of the informative priors image search result summarization system 100 and method may be implemented.

Figure 7:
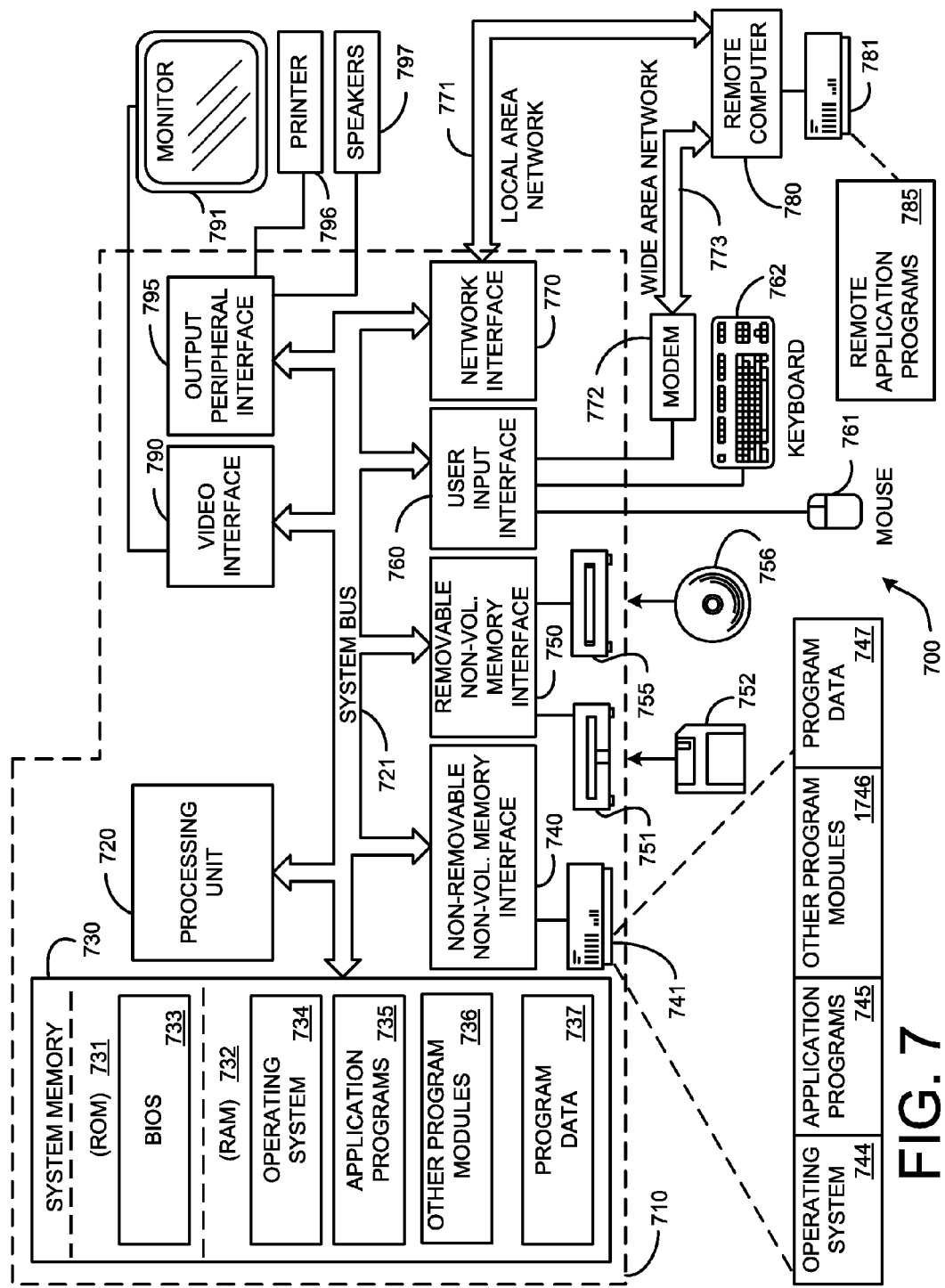
FIG. 7 illustrates an example of a suitable computing system environment in which embodiments of the informative priors image search result summarization system and method shown in FIGS. 1-6 may be implemented.

FIG. 7 illustrates an example of a suitable computing system environment in which embodiments of the informative priors image search result summarization system 100 and method shown in FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment.

Embodiments of the informative priors image search result summarization system 100 and method are operational with numerous other general purpose or special purpose computing system environments or configurations. Examples of well known computing systems, environments, and/or configurations that may be suitable for use with embodiments of the informative priors image search result summarization system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the informative priors image search result summarization system 100 and method may be described in the general context of computer-executable instructions, such as program modules, being executed by a computer. Generally, program modules include routines, programs, objects, components, data structures, etc., that perform particular tasks or implement particular abstract data types. Embodiments of the informative priors image search result summarization system 100 and method may also be practiced in distributed computing environments where tasks are performed by remote processing devices that are linked through a communications network. In a distributed computing environment, program modules may be located in both local and remote computer storage media including memory storage devices. With reference to FIG. 7, an exemplary system for embodiments of the informative priors image search result summarization system 100 and method includes a general-purpose computing device in the form of a computer 710.

Components of the computer 710 may include, but are not limited to, a processing unit 720 (such as a central processing unit, CPU), a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer readable media. Computer readable media can be any available media that can be accessed by the computer 710 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 710. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within the computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information (or data) into the computer 710 through input devices such as a keyboard 762, pointing device 761, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 720 through a user input interface 760 that is coupled to the system bus 721, but may be connected by other interface and bus structures, such as, for example, a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method implemented on a computing device having a processor for summarizing image search results, comprising: using the computing device having the processor to perform the following:

estimating an image relevance for each image in the image search results as a ranking of each image given by a search engine that provided the image search results in response to a query from a user to the search engine;

computing an image quality for each image based on one or more image quality measures;

clustering images in the image search results using a clustering technique that has as a first informative prior the image quality for each image and as a second informative prior the image relevance for each image to obtain a summary candidate collection containing image clusters and an exemplar image for each cluster;

selecting and ranking each image in the summary candidate collection to obtain an image search results summarization;

selecting a number representing a desired number of summaries; and presenting the image search results summarization to a user based on whether a number of images contained in the image search results summarization is less than the number representing a desired number of summaries.

2. The method of claim 1, further comprising:
computing an image score for each image in the summary candidate collection; and
ranking each image in the summary candidate collection based on its image score.

3. The method of claim 2, further comprising:
computing a similarity between a selected image and another image in a image cluster;
using the similarity to compute a cluster coherence, density, and diversity for the selected image.

4. The method of claim 3, further comprising computing an image score for the selected image using the cluster coherence, density, diversity, image quality, and image relevance.

5. The method of claim 4, further comprising:
computing an image score for each image in a the image cluster; and
identifying an image in the image cluster having a maximum image score.

6. The method of claim 5, further comprising removing the image in the image cluster having the maximum image score from the summary candidate collection:
adding the image in the image cluster having the maximum image score to the selected summaries collection; and
removing the image in the image cluster having the maximum image score from the summary candidate collection.

7. The method of claim 6, further comprising presenting images in the selected summaries collection to the user in an order according to a ranking of the images based on the image score of each image.

8. The method of claim 1, further comprising computing the image quality for each image using color entropy of the image as an image quality measure.

9. The method of claim 1, further comprising clustering images in the image search results using an Affinity Propagation clustering technique that has as a first preference the image quality and as a second preference the image relevance for each image.

10. The method of claim 9, further comprising computing the image quality for each image using at least one of the following as an image quality measure: (a) dynamic range, which denotes a luminance range of a scene being photographed and is a ratio between a maximum and a minimum measurable light intensities; (b) color entropy, which describes a colorlessness of image content; (c) brightness, which describes an amount of light in an image; (d) blur, which describes a sharpness of an image; and, (e) contrast, where good-quality images are generally under strong contrast between a subject and a background.

11. A method implemented on a computing device having a processor for performing image search results summarization on a plurality of initially-ranked search results ranked by a search engine, comprising:
    using the computing device having the processor to perform the following:
    setting as a first preference an image relevance for each image corresponding to an initial ranking by the search engine;
    selecting one or more image quality measures;
    computing an image quality for each image using the selected image quality measures;
    clustering images in the plurality of initially-ranked search results using a clustering algorithm using the first preference and a second preference to obtain a plurality of clusters;
    selecting an exemplar image for each of the plurality of clusters and including the exemplar image and images in the plurality of clusters in a summary candidate collection;
    selecting a cluster and an image from the summary candidate collection;
    selecting a number representing a desired number of summaries;
    determining whether a number of images contained in a selected summaries collection is less than the number representing a desired number of summaries;
    if so, then setting the summary candidate collection equal to images in the plurality of initially-ranked search results minus the number of images contained in the selected summaries collection;
    computing an image score for each image in the selected cluster using the image relevance, the image quality, a cluster coherence, a density, and a diversity;
    identifying an image in the selected cluster having a maximum image score as compared to other images in the selected cluster;
    adding the image having a maximum image score to a selected summaries collection and removing the image having a maximum image score from the summary candidate collection; and
    displaying to a user images in the selected summary collection in a ranked order based on the image score of the image.

12. The method of claim 11, further comprising:
    determining whether a number of images contained in the summary candidate collection is greater than zero; and
    if not, then displaying to the user the images in the selected summaries collection.

13. The method of claim 11, further comprising:
    computing a visual distance between a selected image and other images in the selected cluster;
    defining a scaling parameter;
    computing a similarity between the selected image and the other images in the selected cluster using the visual distance and the scaling parameter.

14. The method of claim 13, further comprising computing the cluster coherence, density, and diversity for the selected image using the computed similarity.

15. A computer-implemented method for generating summary images for an image search result containing a plurality of initially-ranked images, comprising:
    setting as a first preference an image relevance of the plurality of initially-ranked images, denoted as R(i), which is an image relevance of an image in the $i^{th}$ position of the image search result;
    computing an image quality of each of the plurality of initially-ranked images using a quality measure based on color entropy, denoted as Q(i), which is an image quality of an image in the $i^{th}$ position of the image search result;
    clustering the plurality of initially-ranked images using an Affinity Propagation clustering technique having the image relevance as the first preference and the image quality as the second preference to obtain a plurality of clusters;
    selecting an exemplar image from each of the plurality of clusters and including the exemplars and images in the plurality of clusters in a summary candidate collection;
    selecting a cluster from the summary candidate collection and an image from the selected cluster;
    obtaining a cluster coherence, Coh(i), a density, Dens(i), a diversity, Div(i), the image quality, Q(i), and the image relevance, R(i), for an $i^{th}$ image in the selected cluster;
    computing an image score, $S_i$, for the $i^{th}$ image using the following equation:

$$S_i = W_1 \times \text{Coh}(i) + W_2 \times \text{Dens}(i) + W_3 \times \text{Div}(i) + \alpha \times R(i) + \beta \times Q(i),$$

where $W_1$ is a first weight, $W_2$ is a second weight, $W_3$ is a third weight, $\alpha$ is a first parameter, and $\beta$ is a second parameter, until each image in the selected cluster has an image score;
    identifying an image in the selected cluster having a maximum image score, removing the identified image from the summary candidate collection, and adding the identified image to a selected summaries collection; and
    displaying to a user images in the selected summaries collection that are ranked accordingly to a respective image score.

16. The computer-implemented method of claim 15, further comprising clustering the plurality of initially-ranked images using the Affinity Propagation clustering technique to find an overall preference, P(i), for the image in the $i^{th}$ position of the image search result using the equation:

$$P(i) = \alpha \times R(i) + \beta \times Q(i) + c,$$

where c is a constant.

17. The computer-implemented method of claim 15, further comprising computing the cluster coherence, Coh(i), for an $i^{th}$ image in the selected cluster, $C_i$, using the equation:

$$\text{Coh}(i) = \Sigma_{I_i, I_j \in C_i} S(I_i, I_j),$$

where $S(I_i, I_j)$ is a similarity based on a distance between the $i^{th}$ image, $I_i$, and a $j^{th}$ image, $I_j$, and the distance, Dis(i,j), given by the equation:

$$S(I_i, I_j) = \exp\left(-\frac{\text{Dis}(i, j)}{\alpha^2}\right).$$

18. The computer-implemented method of claim 17, further comprising computing the density, Dens(i), for the $i^{th}$ image in the selected cluster, using the equation:

$$\text{Dens}(i) = \Sigma_{I_j} S(I_i, I_j),$$

where $I_j$ is an image in the image search result other than $I_i$.

19. The computer-implemented method of claim 18, further comprising computing the diversity, Div(i), for the $i^{th}$ image in the selected cluster, using the equation:

$$\text{Div}(i) = \max_{I_j \in A} S(I_i, I_j),$$

where A is a set of selected images.

* * * * *

UNITED STATES PATENT AND TRADEMARK OFFICE
CERTIFICATE OF CORRECTION

| | | |
|---|---|---|
| PATENT NO. | : 8,346,767 B2 | Page 1 of 1 |
| APPLICATION NO. | : 12/764917 | |
| DATED | : January 1, 2013 | |
| INVENTOR(S) | : Yang et al. | |

It is certified that error appears in the above-identified patent and that said Letters Patent is hereby corrected as shown below:

In the Drawing,

Drawing Sheet 7 of 7, Fig. 7, line 1, delete "1746" and insert -- 746 --, therefor.

In the Claim,

Column 14, line 41, Claim 5, delete "a the" and insert -- the --, therefor.

Signed and Sealed this
Tenth Day of February, 2015

Michelle K. Lee
*Deputy Director of the United States Patent and Trademark Office*